(12) United States Patent
Mimatsu

(10) Patent No.: US 8,190,818 B2
(45) Date of Patent: May 29, 2012

(54) APPARATUS AND METHOD FOR MANAGING A PLURALITY OF KINDS OF STORAGE DEVICES

(75) Inventor: Yasuyuki Mimatsu, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/165,831

(22) Filed: Jun. 22, 2011

(65) Prior Publication Data

US 2011/0252354 A1 Oct. 13, 2011

Related U.S. Application Data

(63) Continuation of application No. 12/433,138, filed on Apr. 30, 2009, now Pat. No. 8,046,536, which is a continuation of application No. 11/979,397, filed on Nov. 2, 2007, now Pat. No. 7,546,413, which is a continuation of application No. 11/033,894, filed on Jan. 13, 2005, now Pat. No. 7,308,534.

(51) Int. Cl.
*G06F 13/00* (2006.01)
*G06F 13/28* (2006.01)
*G06F 13/12* (2006.01)
*G06F 13/38* (2006.01)

(52) U.S. Cl. .......................................... 711/114; 710/74

(58) Field of Classification Search .................. 711/114; 710/74

See application file for complete search history.

(56) References Cited

U.S. PATENT DOCUMENTS

| 5,377,322 | A | 12/1994 | Ogura et al. |
| 6,792,486 | B1 | 9/2004 | Hanan et al. |
| 7,308,534 | B2 | 12/2007 | Mimatsu |
| 7,546,413 | B2 | 6/2009 | Mimatsu |
| 2003/0212781 | A1* | 11/2003 | Kaneda et al. ................. 709/223 |
| 2004/0128443 | A1* | 7/2004 | Kaneda et al. ................. 711/114 |
| 2005/0108452 | A1 | 5/2005 | Loffink |
| 2005/0108476 | A1 | 5/2005 | Tanaka et al. |
| 2005/0182874 | A1* | 8/2005 | Herz et al. ....................... 710/74 |

(Continued)

FOREIGN PATENT DOCUMENTS

JP 11-242649 9/1999

(Continued)

OTHER PUBLICATIONS

R. Elliott, "Serial Attached SCSI Physical layer", HP Industry Standard Servers, Server Storage Advanced Technology, Sep. 30, 2003.

(Continued)

*Primary Examiner* — Edward Dudek, Jr.
(74) *Attorney, Agent, or Firm* — Mattingly & Malur, P.C.

(57) ABSTRACT

A storage system including a memory unit having a disk management program, plural disk controllers each having a SAS port which can be attached to either a SAS disk drive or a SATA disk drive, and a LAN port which communicates with a user interface program in a management console. Upon receiving a request from the user interface program requesting what kinds of disk drives are attached to the disk controllers, the disk management program communicates with each disk controller to determine what kind of disk drive is attached to the disk controller, selects based on a result an appropriate protocol for the disk drive, sends a request to the disk controller to retrieve detailed information of the disk drive using the selected protocol, and sends the detailed information received from the disk controller back to the user interface program for display on a monitor of the management console.

13 Claims, 24 Drawing Sheets

U.S. PATENT DOCUMENTS

2006/0136644 A1    6/2006    Martin et al.

FOREIGN PATENT DOCUMENTS

JP    2004-31507    1/2004

OTHER PUBLICATIONS

R. C. Elliott, Working Draft American National Standard, Project T10/1601-D, Information Technology—Serial Attached SCSI-1.1 (SAS-1.1), Jul. 26, 2004, pp. 1-476.

J. Masiewicz, Working Draft American National Standard, Project 1532D vol. 1, T13, Information Technology—AT Attachment with Packet Interface—7 vol. 1—Register Delivered Command Set, Logical Register Set (ATA/ATAPI-7 V1), Apr. 21, 2004, pp. 1-370.

Serial ATA: High Speed Serialized AT Attachment, APT Technologies, Inc., Jan. 7, 2003, pp. 1-310.

02-157r0 SAS Proposed Serial Attached SCSI working draft, American National Standard Institute, Inc. (R.C. Elliott Technical Editor), Apr. 25, 2002.

\* cited by examiner

11007

| Disk Controller | Port Status | Sector Size | # of Sectors | Serial Number | ... | # of Errors | ... |
|---|---|---|---|---|---|---|---|
| 1 | | | | | | | |
| 2 | | | | | | | |
| ... | | | | | | | |

Columns: 20001, 20002, 20003, 20004, 20005, 20006

| Storage System | IP Address | Kind of Drives | # of Disk drives | Total Capacity | # of Errors |
|---|---|---|---|---|---|
| 1 | | SAS | | | |
| | | SATA | | | |
| | | NONE | | - | - |
| 2 | | SAS | | | |
| | | SATA | | | |
| | | NONE | | - | - |
| ... | | | | | |

Columns: 30001, 30002, 30003, 30004, 30005, 30006

| Disk Controller /Expander Port # | Port Status | Sector Size | # of Sectors | Serial Number | ... | # of Errors | ... |
|---|---|---|---|---|---|---|---|
| 1/1 | | | | | | | |
| 1/2 | | | | | | | |
| ... | | | | | | | |
| 2/1 | | | | | | | |
| 2/2 | | | | | | | |
| ... | | | | | | | |

Column labels: 11111, 20002, 20002, 20003, 20004, 20005

| Expander Port # | Port Status | Sector Size | # of Sectors | Serial Number | ... | # of Errors | ... |
|---|---|---|---|---|---|---|---|
| 1 | | | | | | | |
| 2 | | | | | | | |
| | | | | | | | |

| Port Address /170001 | LUN /170002 | Disk Controller /170003 |
|---|---|---|
|  |  |  |
|  |  |  |
| ... |  |  |

| Port Address | LUN | # of Disk Drives | Disk Controller / Expander Port # |
|---|---|---|---|
| | | | |
| | | | |
| | | | ... |
| | | | |
| | | | |
| | | | ... |
| | | | |

200001 — Port Address
200002 — LUN
200003 — # of Disk Drives
200004 — Disk Controller / Expander Port #

FIG. 24

APPARATUS AND METHOD FOR MANAGING A PLURALITY OF KINDS OF STORAGE DEVICES

CROSS-REFERENCES TO RELATED APPLICATIONS

This application is a continuation of U.S. patent application Ser. No. 12/433,138, filed Apr. 30, 2009, now allowed, which is a continuation of U.S. patent application Ser. No. 11/979,397, filed Nov. 2, 2007, which was issued on Jun. 9, 2009 and assigned U.S. Pat. No. 7,546,413, which is a continuation of U.S. patent application Ser. No. 11/033,894, filed Jan. 13, 2005, which was issued on Dec. 11, 2007 and assigned U.S. Pat. No. 7,308,534, the entire disclosures of which are incorporated herein by reference.

BACKGROUND OF THE INVENTION

The present invention relates generally to managing computer storage systems. More particularly the present invention relates to a method, apparatus and computer program for managing computer storage systems having a plurality of different kinds of disk drives that can be attached to the same connecter and use different communication protocols.

In recent years, some new communication protocols of computer storage systems have been developed and set as industry standards. For example, Serial Advanced Technology Attachment (SATA) was developed to provide highly scalable architecture to inexpensive large capacity disk drives. Another example is Serial Attached Small Computer System Interface (SAS) was developed to provide high performance and highly reliable Small Computer System Interface (SCSI) drives with serial point-to-point interface and data routing functions.

SAS has numerous enhancements relative to conventional SCSI including, for example, a specification of physical design and protocols to allow SATA drives to be attached to SAS connectors directly. The specification defines how the connector to which a disk drive is attached recognizes what kind of disk drive is being attached. Once the disk drive being attached has been recognized, application programs can read/write data from/to the disk drive according to a specific protocol. By putting SAS drives and SATA drives together into one computer storage system, the system can provide highly reliable and high speed drives as well as inexpensive large capacity disk drives as needed by the situation. Furthermore, the number of SAS and SATA disk drives can be changed flexibly because any SAS connector can be used for a SAS or SATA disk drive. By using a computer storage system which employs SAS architecture, that is a computer storage system that includes SAS and SATA disk drives attached to SAS connectors, users can choose the appropriate storage area to store data according to necessary performance and/or availability.

American National Standard Institute (ANSI) "Project T10/1601-D: Serial Attached SCSI—1.1 (SAS—1.1) (Working Draft)", Rev. 5, pp 25-42, 26 Jul. 2004 discloses the general architecture of SAS disk drives.

ANSI, "T13 Project 1532D: AT Attachment with Packet Interface-7 Vol. 1—Register Delivered Command Set, Logical Register Set (ATA/ATAPI-7 V1) (Working Draft)", Rev. 4b, 21 Apr. 2004, and APT Technologies, Inc., Dell Computer Corporation, Intel Corporation, Maxtor Corporation, Seagate Technology, "Serial ATA: High Speed Serialized AT Attachment", Rev. 1.0a, 7 Jan. 2003, disclose the general architecture of ATA disk drives.

In order to manage, maintain, and make good use of a storage system, administrators must understand the configuration of the system including information of the disk drives: kind (SAS, SATA, etc.), vendor, serial number, capacity, attached port, etc. In addition, if the storage system contains both SAS and SATA disk drives, it is convenient for users to be able to calculate statistical values (total and used capacity, number of errors, performance metrics, etc.) separately for SAS and SATA disk drives. Generally, information of a disk drive is retrieved by sending a command from a controller to the disk drive and receiving a response in a manner specific to the communication protocol the disk drive uses. For example, information of a SAS disk drive is retrieved by sending INQUIRY and READ CAPACITY commands defined by the SCSI protocol. Whereas, information of a SATA disk drive is retrieved by sending an IDENTIFY DEVICE command defined by the ATA protocol. Therefore, a conventional controller which uses one protocol to communicate with disk drives cannot manage a storage system which contains plural kinds of disk drives which use different kinds of communication protocols.

SUMMARY OF THE INVENTION

The present invention provides a method, apparatus and computer program for managing a storage system having a plurality of different kinds of disk drives that can be attached to the same connecter and use different communication protocols.

The storage system according to the present invention includes a system controller having a central processing unit (CPU) and a memory unit which has stored therein a disk management program, a plurality of disk controllers each having a SAS port, wherein either a SAS or SATA disk drive can be attached to the SAS port, and a local area network (LAN) port which communicates with a user interface program in a management console via a network. When the disk management program receives a request from the user interface program requesting information as to what kind of disk drives are attached to the disk controllers, the disk management program communicates with each disk controller to determine what kind of disk drive is attached to the disk controller, selects an appropriate protocol for the disk drive attached to the disk controller, sends a request to the disk controller to retrieve detailed information of the disk drive attached to the disk controller using the selected protocol, and sends the information received from disk controller back to the user interface program.

When the user interface program receives the information of the disk drive attached to the disk controller from the disk management program, the user interface program displays the information of disk drive and/or statistical values separately for other SAS and SATA disk drives connected to the other disk controllers on a monitor of the management console for review by the user. The user interface program helps the user to manage plural kinds of disk drives appropriately based on the kinds of the disk drives using the displayed information.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

FIG. 2 is a diagram for explaining a Disk Management Table 11007 according to an embodiment of the present invention;

FIG. 3 is a diagram for explaining a System Management Table 12007 according to an embodiment of the present invention;

FIG. 14 is a diagram for explaining a Disk Management Table A 11100 according to another embodiment of the present invention;

FIG. 16 is a diagram for explaining a Disk Management Table B 41002 according to another embodiment of the present invention;

FIG. 21 is a diagram for explaining a Volume Management Table 11014 according to another embodiment of the present invention;

FIG. 24 is a diagram for explaining a Volume Management Table 11109 according to another embodiment of the present invention.

DETAILED DESCRIPTION OF THE INVENTION

The present invention as will be described in greater detail below provides an apparatus, method and computer program, particularly, for example, a method, apparatus and computer program for managing a storage system having a plurality of different kinds of disk drives that can be attached to the same connecter and use different communication protocols. The present invention provides various embodiments including the $1^{st}$ and $2^{nd}$ embodiments as described below. However it should be noted that the present invention is not limited to the embodiments described herein, but could extend to other embodiments as would be known or as would become known to those skilled in the art.

1. $1^{st}$ Embodiment

In the $1^{st}$ embodiment, the information of both SAS and SATA disk drives in a storage system is retrieved and displayed on a GUI of a management console. The method to frequently update configuration information in the storage system is also described. Host computers read and write data in the SAS and SATA disk drives, which are provided as SCSI LUs (Logical Units) for host computers, by specifying a disk drive and Logical Block Address (LBA).

A. System Architecture

Figure 1:
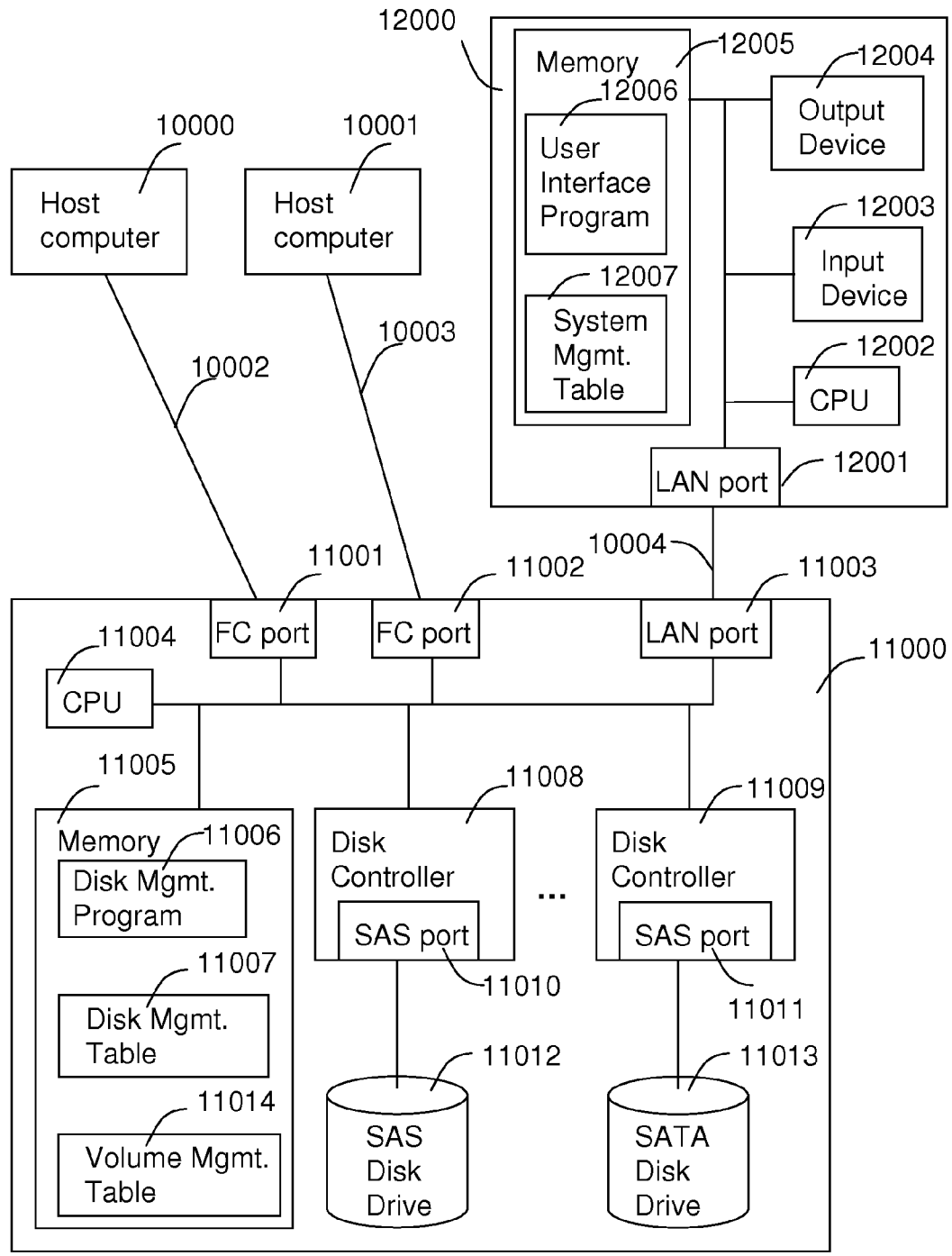
FIG. 1 is a diagram for explaining an example storage system in which the method, apparatus and computer program for managing a storage system having a plurality of different kinds of disk drives according to the an embodiment of the present invention.

FIG. 1 shows a computer storage system and a management console in which the method and apparatus of this invention are applied.

Storage system 11000 includes a central processing unit (CPU) 11004, one or more Fibre Channel (FC) ports 11001 and 11002, a local area network (LAN) port 11003, a memory 11005, one or more disk controllers 11008 and 11009, and one or more disk drives 11012 and 11013. The storage system 11000 is attached to host computers 10000 and 10001 via FC ports 11001 and 11002 and FC networks 10002 and 10003. The storage system is also attached to a management console 12000 via LAN 11003 and LAN cable 10004. FC networks may comprise FC switches in addition to FC cables.

The memory 11005 contains disk management program 11006 which communicates with the management console and controls the storage system, a disk management table 11007 which contains information of all disk drives in the storage system, and a volume management table 11014 which contains mapping information between disk drives and FC port address and Logical Unit Number (LUN).

FIG. 2 shows the structure of the disk management table 11007 having a plurality of entries or rows. Each row in the disk management table 11007 contains information of each disk drive in the storage system. Columns 20001, 20002, 20003, 20004, 20005, and 20006 of the disk management table 11007 respectively contain identification (ID) number of each disk controller in the storage system, a status of a port in the disk controller to which the disk drive is attached, a sector size, a number of sectors, a serial number of the disk drive, and a number of errors which may have occurred when data is read from or written to the disk drive.

The port status 20002 indicates the kind of drive being attached to the port including, for example, SAS which indicates a SAS disk drive is attached, SATA which indicates SATA disk drive is attached, or NONE which no disk drive is attached to the port of the disk controller. The IDs in column 20001 are predefined according to the structure of the storage system. The information in column 20006 are recorded and updated by disk management program 11006 when an input/output (I/O) request to a disk drive failed. The other values in columns 20003-20005 are recorded by the disk management program along the method described below.

FIG. 21 shows the structure of volume management table 11014 having a plurality of entries or rows. Each row in the volume management table 11014 contains mapping information between FC port address and LUN, and a disk controller number which controls a disk drive to which are assigned the port address and LUN. Columns 170001, 170002, and 170003 contain FC port address, LUN, and the ID number of a disk controller, respectively. This mapping information allows host computers to identify a disk drive by specifying the FC port address and LUN.

Disk controllers 11008 and 11009 receive requests from the disk management program 11006 and controls disk drives 11012 and 11013 respectively. A SAS disk drive 11012 is attached to SAS port 11010 in disk controller 11008 and SATA disk drive 11013 is attached to SAS port 11011 in disk controller 11009. Each of the disk controllers 11008 and 11009 can be implemented as a microcomputer which has its own processor and memory.

Figure 4:
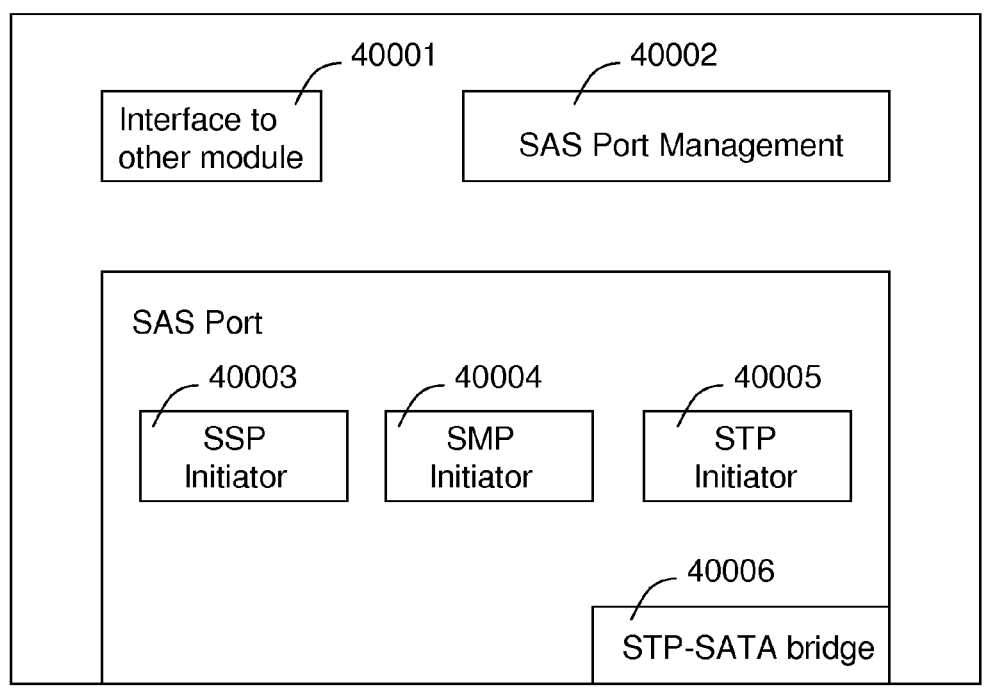
FIG. 4 is a diagram for explaining functional aspects of a disk controller 11008, 11009 according to an embodiment of the present invention.

FIG. 4 shows a functional diagram of a disk controller 11008, 11009. Interface function 40001 communicates with other modules (CPU, memory, etc.) in the storage system 11000 to receive requests from the disk management program 11006, processes requests, and sends information to disk management program 11006. The SAS port 11010, 11011 has initiator functions 40003-40005 of three kinds of SAS protocols, namely Serial SCSI Protocol (SSP), Serial Management Protocol (SMP), and Serial ATA Tunneled Protocol (STP), to communicate with both SAS and SATA drives. Disk controller 11008, 11009 also includes a STP-SATA bridge function 40006 to communicate with a SATA drive attached to SAS port directly. A SAS Port Management function 40002 executes management functions which are necessary for operating a SAS device, such as a Discover process which sends DISCOVER and REPORT GENERAL requests to the SAS port 11010, 11011 and determines whether an attached drive is a SAS or SATA disk drive. Functions 40002-40006 performed by the disk controller 11008, 11009 are based on specification of SAS and SATA and detailed implementation is beyond the scope of this invention and as such will not be discussed herein. However, it should be noted that such detailed implementation is known to those of ordinary skill in the art. Interface 40001 can be implemented as an application program interface (API) used by disk management program 11006 to access information and invoke the functions 40002-40005.

In management console 12000, a memory 12005 contains an user interface program 12006, which provides an user interface to control the storage system 11000, and system management table 12007. The management console 12000 includes an input device 12003 and an output device 12004 which are general peripheral devices such as a keyboard, mouse and display. An user interacts with the user interface program 12006 by using these devices. A system management table 12007 contains the configuration information of the storage system 11000, which is updated by user interface program 12006.

FIG. 3 shows the structure of system management table 12007 having a plurality of entries or rows corresponding to a plurality of storage systems. It should be noted however that FIG. 1 illustrates a single storage system 11000. The present invention can be implemented including a plurality of storage systems. Thus, FIG. 1 should be considered as representative of an embodiment where a plurality of storage systems are provided.

Each row of the system management table 12007 contains predefined ID numbers (Column 30001) and IP addresses (Column 30002) of the storage system 11000 or storage systems (not shown) which are managed by the user interface program 12006. For each storage system 11000, each row contains statistical information concerning each storage system 11000 such as the kinds of disk drive attached to the ports of the storage system (Column 30003), a number of disk drives (Column 30004), a total capacity (Column 30005), and a number of errors for each kind of disk drive (Column 30006). In the row which contains 'None' in Column 30003, Column 30004 contains number of empty SAS ports and Column 30005 and 30006 contain no valid information. The IP address of the storage systems are specified by an user and stored into the system management table 12007 in Column 30002. Other information is derived from the storage system 11000 by the user interface program 12006 which communicates with the disk management program 11006.

B. Method to Get Disk Drive Information

FIGS. 5, 8, 9, and 10 each illustrate various processes performed as a result of execution of the user interface program 12007 and the disk management program 11006. The flow chart illustrated in each of FIGS. 5, 8, 9, and 10 can, for example, be implemented by hardware and/or software. If implemented by software each of the steps of the flow chart can, for example, correspond to computer program code or instructions executed by a processor.

Figure 5:
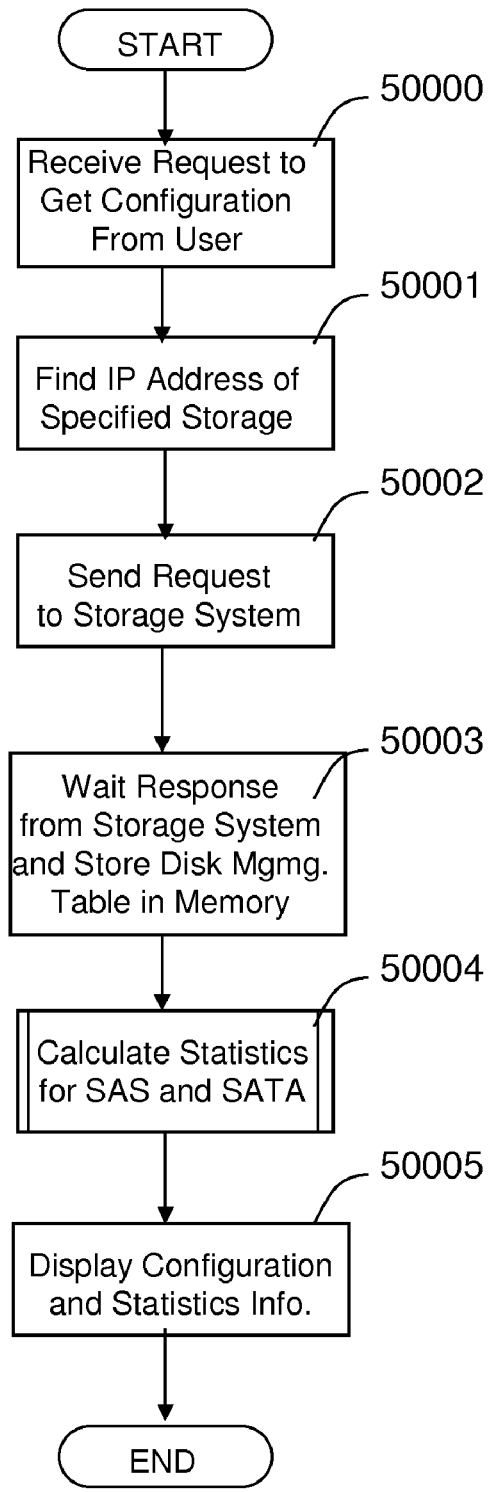
FIG. 5 is a flowchart of the steps performed by the user interface program 12006 according to an embodiment of the present invention.

As illustrated in FIG. 5 the flow of the process proceeds as follows. First, the user interface program receives a request to get configuration information of a storage system from an user via the input device (Step 50000). The user interface program looks up the IP address of specified storage system in the system management table 12007 (Step 50001). The user interface program sends a request to get the configuration information of the storage system to the disk management program 11006 using the IP address (Step 50002), and waits for a response (Step 50003) from the disk management program 11006.

Figure 9:
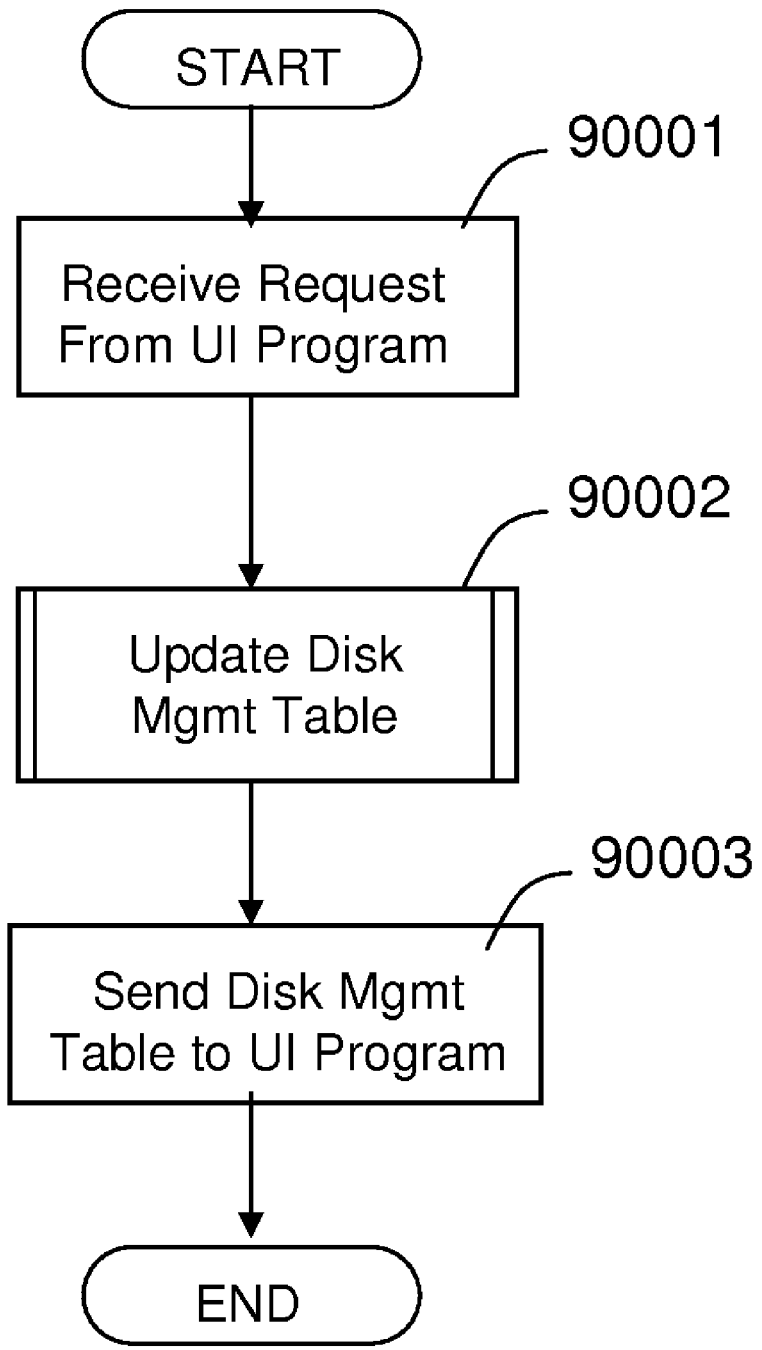
FIG. 9 is a flowchart of the steps performed by the disk management program 11006 according to an embodiment of the present invention.

As illustrated in FIG. 9 the flow of the process proceeds as follows. When the disk management program 11006 receives the request from the user interface program (Step 90001 in FIG. 9), the disk management program 11006 updates the information stored in disk management table (Step 90002), and then sends back the information to the user interface program 12006 via LAN port 11003 (Step 90003).

Figure 10:
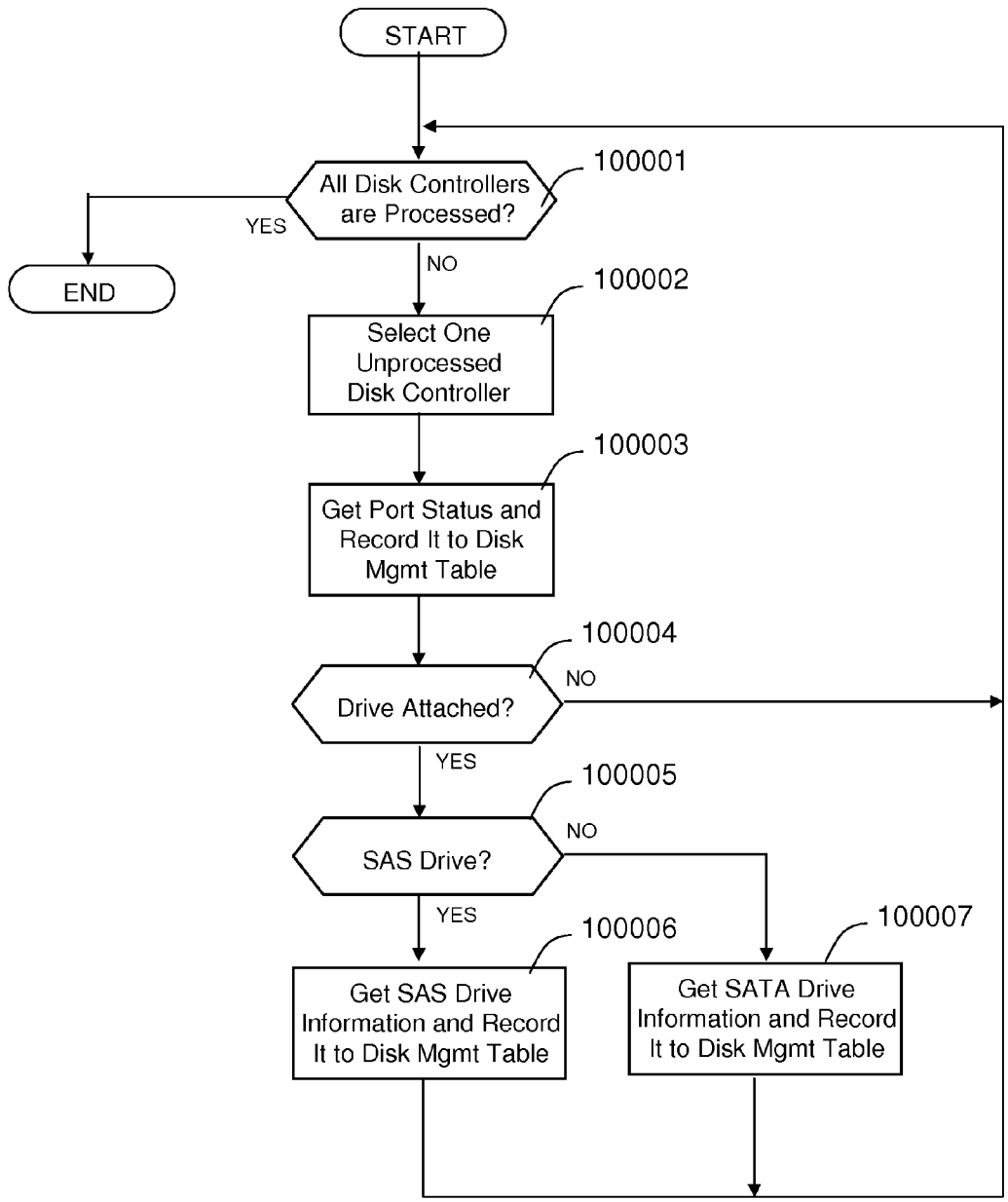
FIG. 10 is a flowchart detailing the steps performed to implement step 90002 of the disk management program 12006 according to an embodiment of the present invention.

As illustrated in FIG. 10 the flow of the process proceeds as follows. FIG. 10 represents the detail of the process of updating the disk management table 11007 according to Step 90002 in FIG. 9. In FIG. 10 first, the disk management program chooses one disk controller from the disk management table 11007. If all disk controllers have been processed to obtain drive information, then the process is completed (Step 100001). If not all disk controllers have been processed, then the disk management program 11006 chooses an unprocessed disk controller to obtain information of a disk drive attached to the disk controller (Step 100002). The disk management program 11006 then gets the status information of the SAS port from the disk controller and stores it into the disk management table (Step 100003). The status information is generated at SAS port 11010, 11011 and provided for the disk management program 11006 by the SAS port management function 40002 in the disk controller 11008, 11009. If the status is 'None', which means no disk drive is attached to the disk controller 11008, 11009, the disk management program 11006 chooses another disk controller 11008, 11009 (Step 100004). If the status is 'SAS' (Step 100005), the disk management program 11006 sends a request to get SAS drive information to the disk controller 11008, 11009 and store the information in the disk management table 11007 (Step 100006). Otherwise, it sends a request to get SATA drive information and store it in the disk management table 11007 (Step 100007). If the disk controller 11008, 11009 receives a request to get information of SAS drive, it sends SCSI commands, such as INQUIRY and READ CAPACITY, to the disk drive. On the other hand, if it receives a request to get information of SATA drive, it sends ATA commands, such as IDENTIFY DEVICE, to the disk drive. The process described above is repeated for each disk controller.

In FIG. 5, when the user interface program 12006 receives the disk management table 11007 from the disk management program 11006, the program stores the disk management table 11007 into the memory 12005 (Step 50003). The user interface program 12006 then calculates the statistics of usage of disk drives, number of errors, etc. (Step 50004). The details of Step 50004 are illustrated in FIG. 8.

Figure 8:
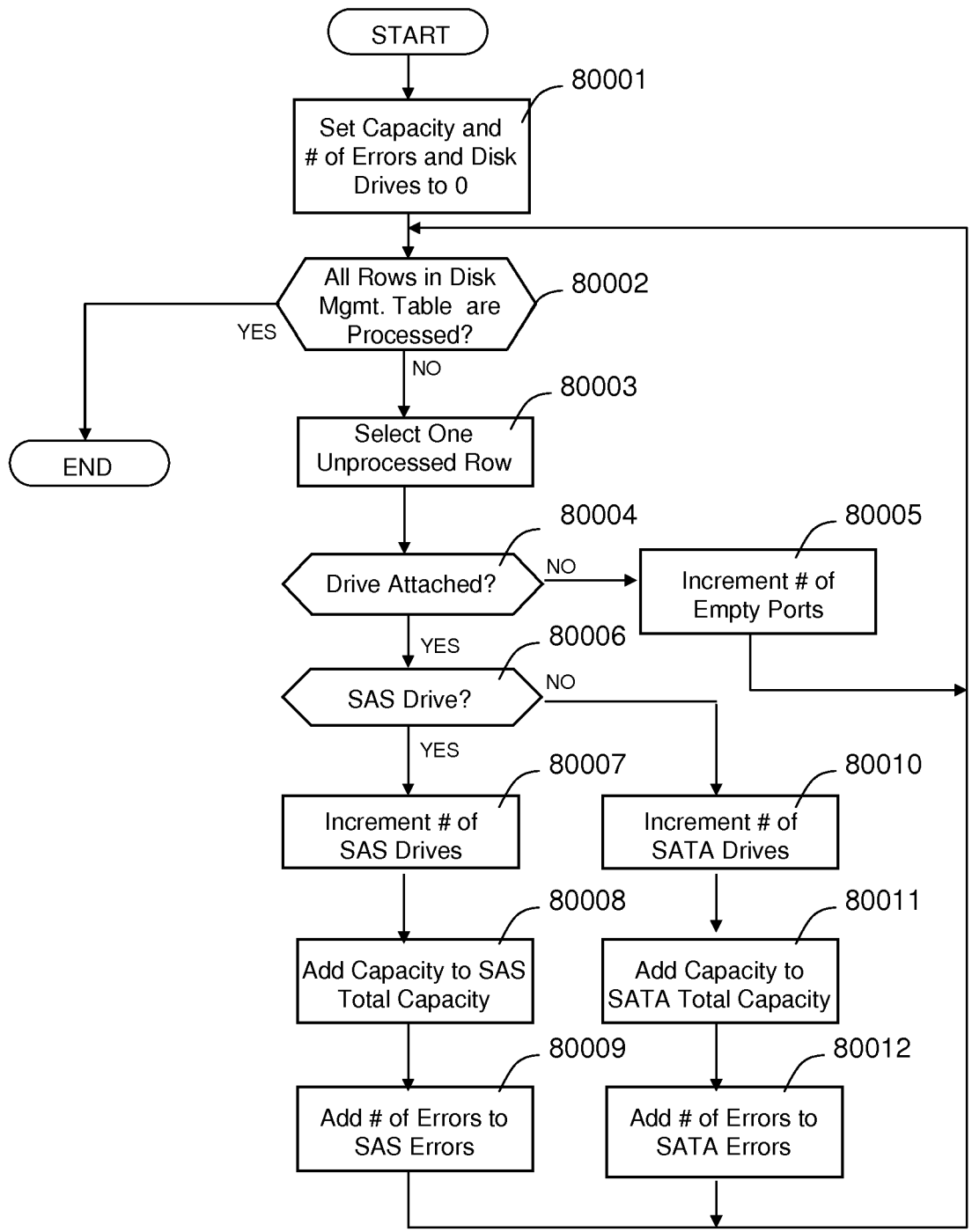
FIG. 8 is a flowchart detailing the steps performed to implement step 50004 of the user interface program 12006 according to an embodiment of the present invention.

FIG. 8 shows the process flow of calculating the statistics information. First, the user interface program 12006 stores zeros in the Columns 30004, 30005, and 30006 of the system management table 12007 (Step 80001). The user interface program 12006 chooses one row in the disk management table 11007 stored in memory 12005. If the user interface program 12006 has completed the processing of all rows, the process finishes (Step 80002). Otherwise, the user interface program 12006 chooses one unprocessed row (Step 80003). If the chosen row contains 'None' in Column 20002 of the disk management table 11007, the user interface program 12006 increments the value in Column 30004 of the system management table 12007 in the row which contains 'None' in Column 30003 (Steps 80004 and 80005). If the Column 20002 in the disk management table 11007 contains 'SAS' (Step 80006), the user interface program 12006 increments the value in Column 30004 of the system management table 12007 in the row which contains 'SAS' in Column 30003 (Step 80007), adds the drive capacity which is generated by multiplying values in Column 20003 and 20004 to total capacity in Column 30005 (Step 80008), and adds number of errors in Column 20006 to Column 30006 (Step 80009). If the Column 20002 in the disk management table 11007 contains "SATA", then the user interface program 12006 does the same process to the row which contains 'SATA' (Step 80010-80012). The process described above is repeated for each row in the disk management table 11007.

Finally, continuing on with FIG. 5, the user interface program 12006 displays configuration and statistic information on an output device 12004 (Step 50005).

Figure 6:
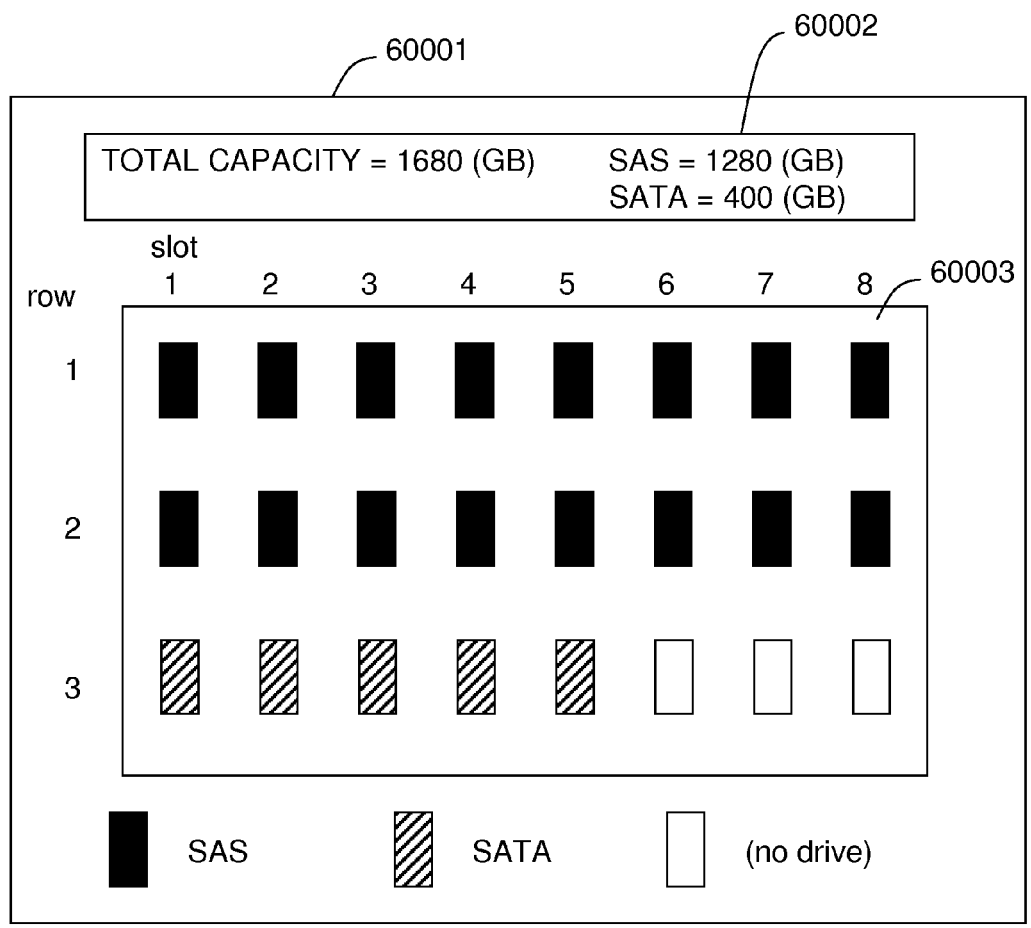
FIG. 6 is a diagram illustrating an example of a Graphical User Interface (GUI) 60001 of the user interface program 12006 according to an embodiment of the present invention.

FIG. 6 shows an example of a GUI displayed by the user interface program 12006 where 60001 is a window or a part of a window in a monitor screen of the output device 12004 of the management console 12000. Pane 60002 displays capacity of SAS and SATA disk drives, which are stored in Column 30005 in the system management table 12007, and the sum of said capacity. Pane 60003 displays the port status of disk drives which is stored in Column 20002 in the disk management table 11007. The status of disk drives ('SAS', 'SATA', and 'None') is displayed by black, hatched, and white boxes, respectively. These boxes are placed in accordance with the position of the disk drives in the chassis of the storage system 11000. The method to make bitmap images of the panes is beyond the scope of this invention but however is well known to those of ordinary skill in the art.

In this embodiment of the present invention, detailed information of each disk drive is displayed by specifying the box with the input device 12003 of the management console 12000. For example, an user can click a box by a pointing device to display detailed information of the disk drive. If a disk drive is specified, the user interface program 12006 displays detailed information of the disk drive in another pane or window.

Figure 7:
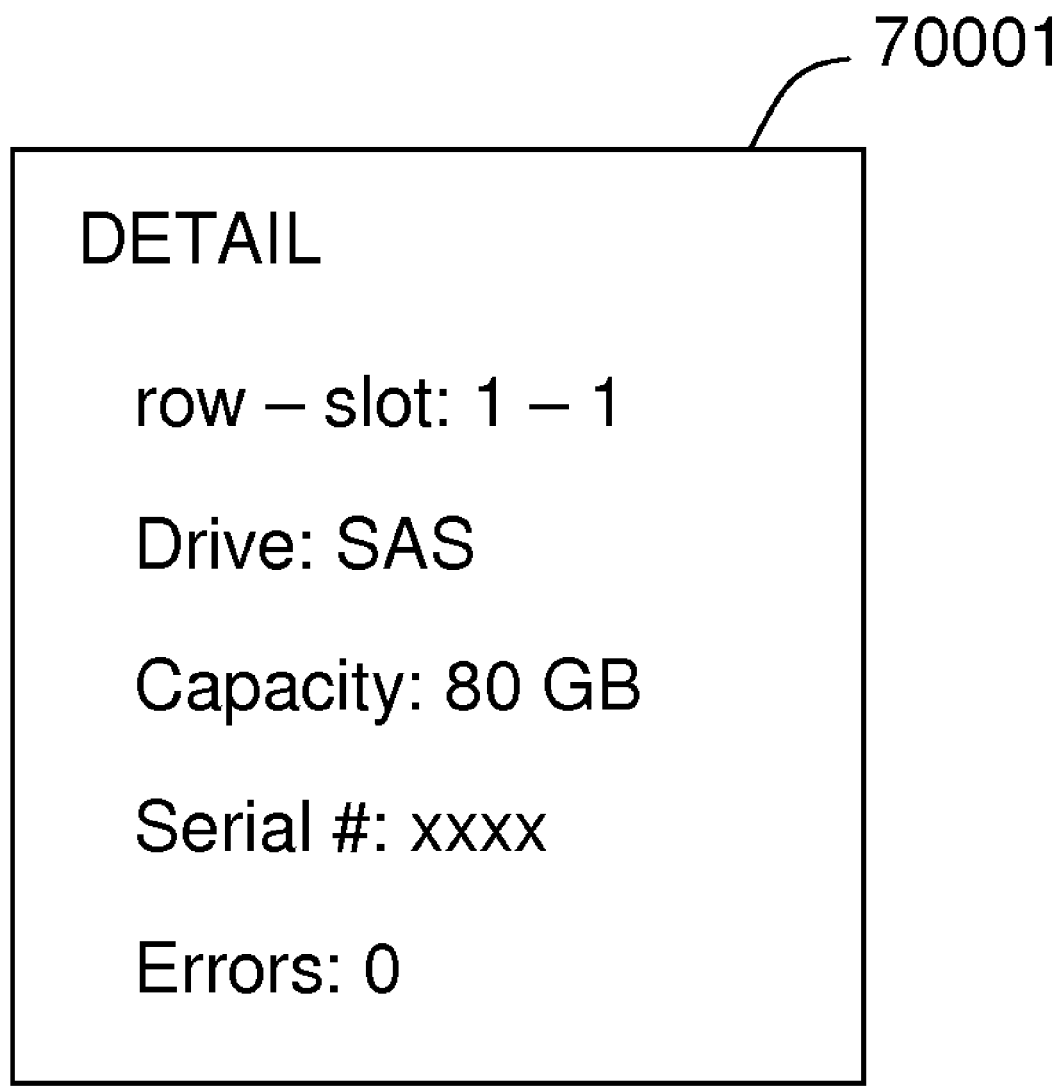
FIG. 7 is a diagram for explaining an example of a display of detailed information of a disk drive in a pane 70001 according to an embodiment of the present invention.

FIG. 7 shows an example of the display of detailed information of the disk drive specified via the user interface program. Pane 70001 contains position (row and slot) of the disk drive and other information which is stored in the disk management table 11007 including kind, capacity, serial number, number of errors, etc.

In the method described above, the disk management program 11006 updates the disk management table 11007 when it receives a request from the user interface program 12006. However, in the method to be described below, it is possible to update the disk management table 11007 frequently and send the updated disk management table 11007 back to the user interface program 12006 immediately when the disk management program 11006 receives a request.

Figure 11:
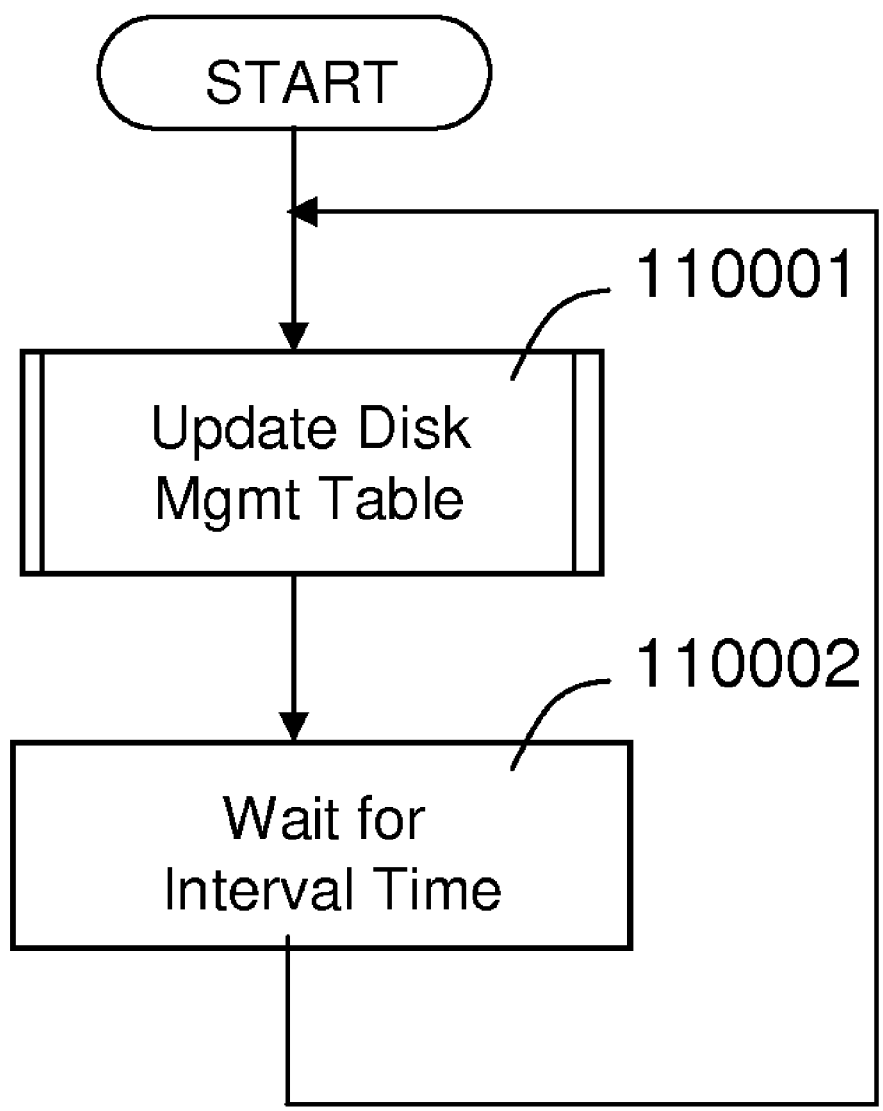
FIG. 11 is a flowchart of further steps performed by the disk management program 11006 according to an embodiment of the present invention.
Figure 12:
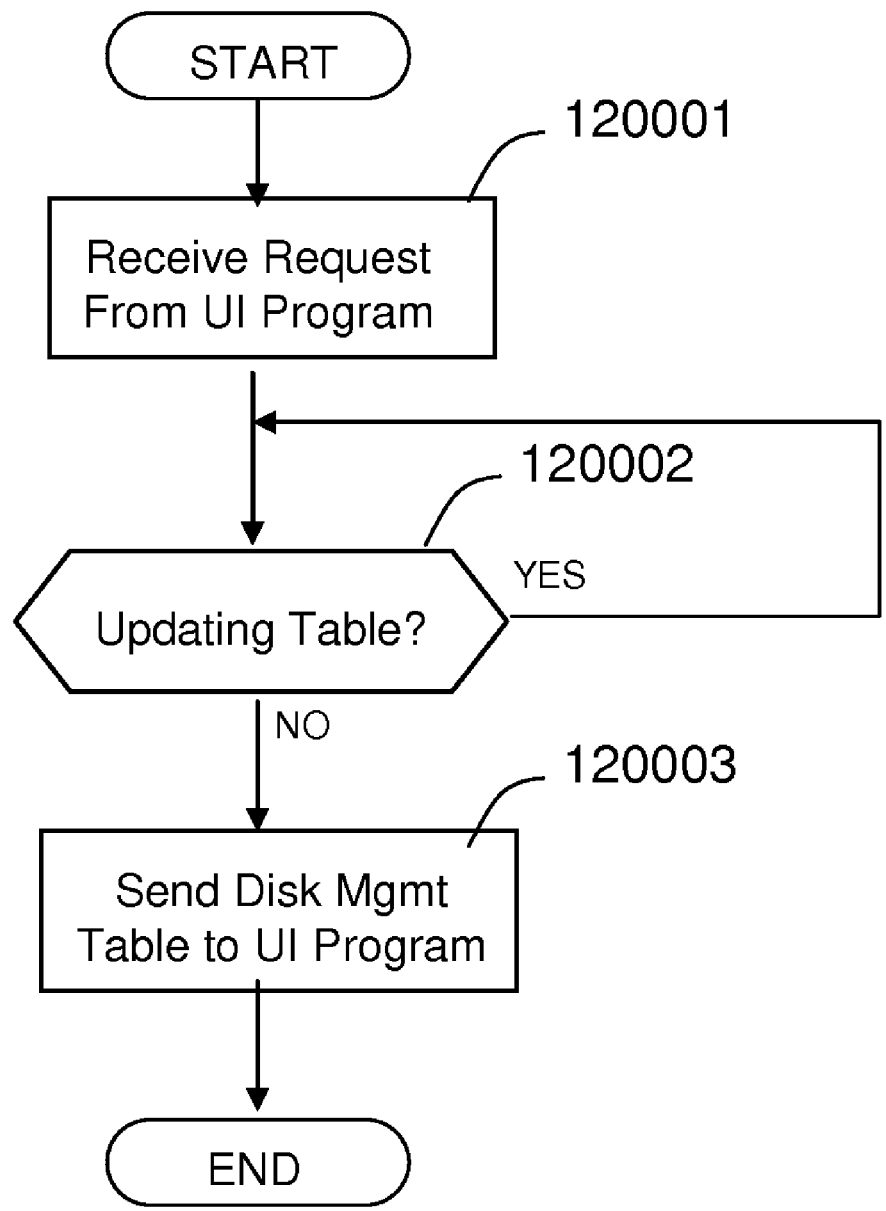
FIG. 12 is a flowchart of even further steps performed by the disk management program 11006 according to an embodiment of the present invention.

FIGS. 11 and 12 show the process flow of the disk management program to update the table frequently. The flow chart illustrated in each of FIGS. 11 and 12 can, for example, be implemented by hardware and/or software. If implemented by software each of the steps of the flow chart can, for example, correspond to computer program code or instructions executed by a processor.

The process flow shown in FIGS. 11 and 12 can be implemented as two independent threads in the disk management program 11006. The process flow of FIG. 11 proceeds as follows. The disk management program 11006 updates the disk management table 11007 in the same manner as that described with respect to FIG. 10 (Step 110001). The disk management program 11006 then repeats the same process frequently at an interval of a specified time (Step 110002).

The process flow of FIG. 12 proceeds as follows. In FIG. 12, when the disk management program 12006 receives a request to get the disk management table 11007 from the user interface program 12006 (Step 120001), the disk management program 11006 checks whether the disk management table 11007 is being updated. If the disk management table 11007 is being updated, the disk management program 11006 waits completion of the update (Step 120002). Otherwise, the disk management program 11006 sends back the disk management table 11007 to the user interface program 12006 (Step 120003). By updating the disk management table 11007 frequently, the response time to a request from the user interface program 12006 becomes short because it is not necessary in all instances to wait the time for the update of the disk management table 11007 to be completed.

C. Method to Read and Write Data in Disk Drives

In this embodiment, host computers send and receive I/O commands in Fibre Channel Protocol for SCSI (FCP) to read and write data stored in SAS and SATA disk drives in the storage system 11000. The commands contain FC port address, LUN, and logical block address (LBA).

Figure 22:
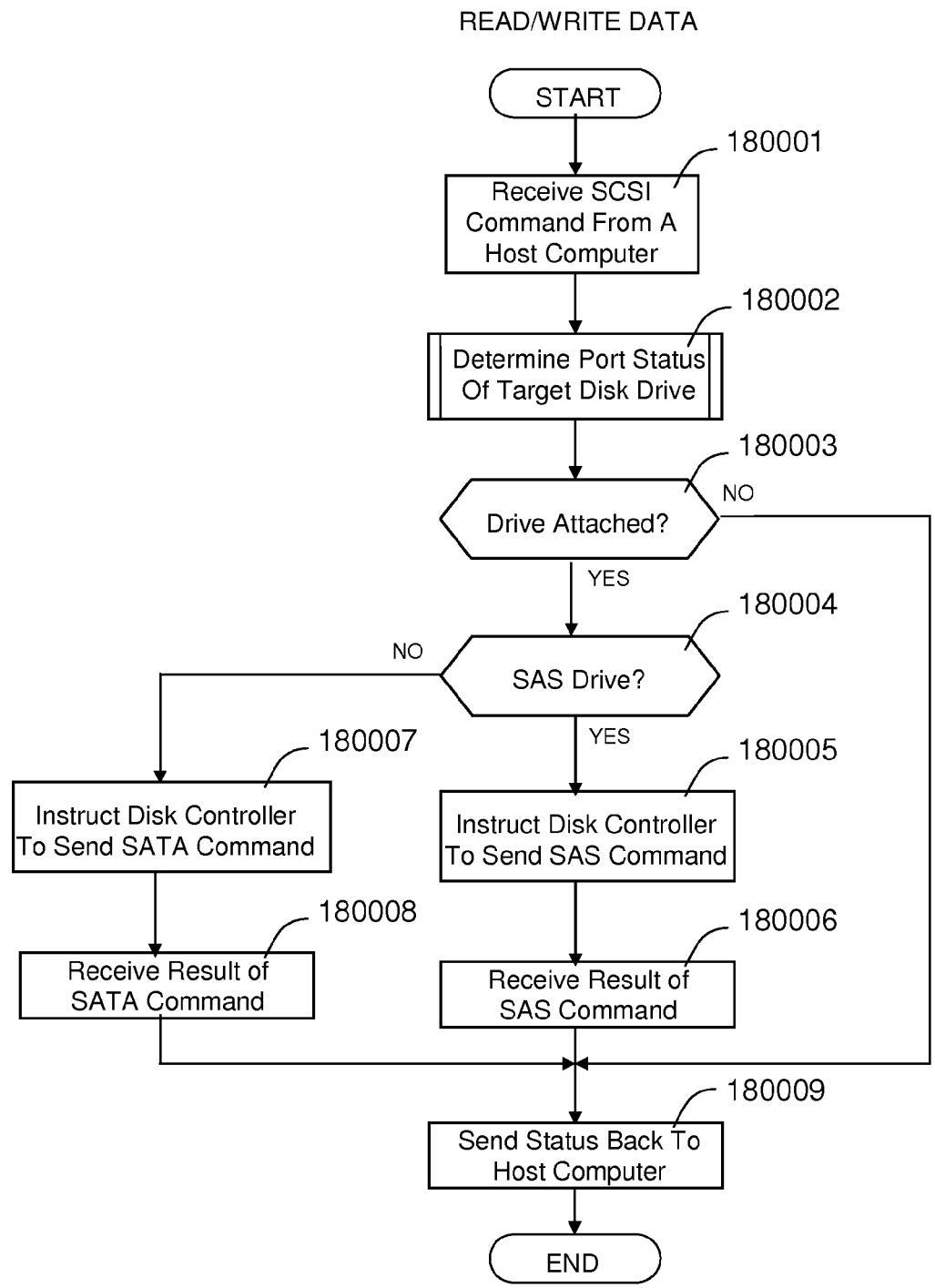
FIG. 22 is a flowchart of steps performed by the disk management program 11006 to read/write data from/to a disk drive according to an embodiment of the present invention.

FIG. 22 shows the process flow of the disk management program 11006 to read/write data from/to a disk drive. The flow chart illustrated in FIG. 22 can, for example, be implemented by hardware and/or software. If implemented by software each of the steps of the flow chart can, for example, correspond to computer program code or instructions executed by a processor.

As illustrated in FIG. 22, when a host computer sends a SCSI command to a FC port in the storage system 11000, the disk management program 11006 receives the SCSI command and retrieves FC port address, LUN, and LBA (Step 180001). The disk management program 11006 determines status of the port to which the target disk drive is attached.

Figure 23:
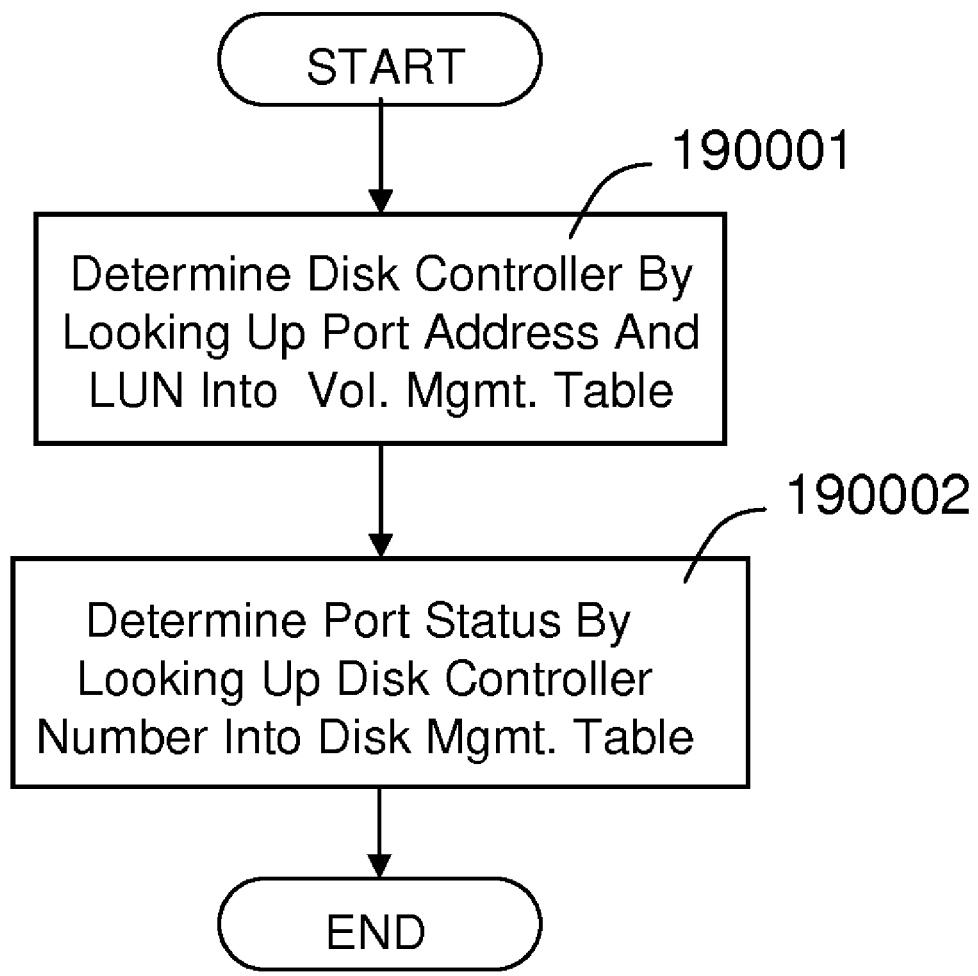
FIG. 23 is a flowchart detailing the steps performed to implement step 180002 of the disk management program 11006 according to an embodiment of the present invention.

FIG. 23 shows details of steps to implement Step 180002 of FIG. 22. First the disk management program 11006 looks into the volume management table 11014 and identifies a disk controller 11008, 11009 which corresponds to the received port address and LUN which are stored in Column 170001 and 170002 of the volume management table 11014, respectively (Step 190001). Then, the disk management program 11006 looks into the disk management table 11007 and determines the status of the port which corresponds to the ID number of the disk controller 11008, 11009 which is stored in Column 20001 of the disk management table 11007 (Step 190002).

Continuing on with the process flow illustrated in FIG. 22, if the status is 'NONE' (Step 180003), the disk management program 11006 returns an error status to the host computer 10000 (Step 180009). Otherwise, the disk management program 11006 determines the kind of disk drive attached to the port (Step 180004). If the status is 'SAS', the disk management program 11006 instructs the identified disk controller 11008 to send one or more SAS commands such as READ and WRITE to read/write data from/to the target disk drive (Step 180005) and receive the result of the SAS disk drive executing the SAS commands (Step 180006). Otherwise, the disk management program 11006 instructs the identified disk controller 11009 to send SATA commands such as READ DMA and WRITE DMA (Step 180007) and receive the result of the SATA disk drive executing the SATA commands (Step 180008). Step 180005 and 180007 may include the process to convert and format the parameters (Command code, LBA, etc.) received from the host computer. Finally, the disk management program 11006 returns status of the SCSI command to the host computer (Step 180009).

In this embodiment, the STP-SATA bridge 40006 as illustrated in FIG. 4 exists in a disk controller 11008, 11009. However, there are other ways of implementation; for example, the STP-SATA bridge can exist in a SAS port of a disk drive rather than the disk controller 11008, 11009. In such case, the bridge function can be removed from the SAS port 11010, 11011 of the disk controller 11008, 11009 to simplify the SAS port 11010, 11011 and reduce its cost.

2. $2^{nd}$ Embodiment

In the $2^{nd}$ embodiment, a number of disk drives in the storage system are connected to a disk controller by an expander. The concept and function of the expander is defined by the specification of SAS and as such is well known to those of ordinary skill in the art. Detailed implementation of the expander is beyond the scope of this invention. The method to update the disk management table when the configuration is changed is also described. Furthermore, the user interface program provides function to help the user to utilize plural kinds of disk drives appropriately based on the kinds of the disk drives. Host computers read and write data in volumes which comprise one or more disk drives. The data received from host computers is striped in blocks and stored in plural disk drives. The differences between the $1^{st}$ and $2^{nd}$ embodiments are described below.

A. System Architecture

Figure 13:
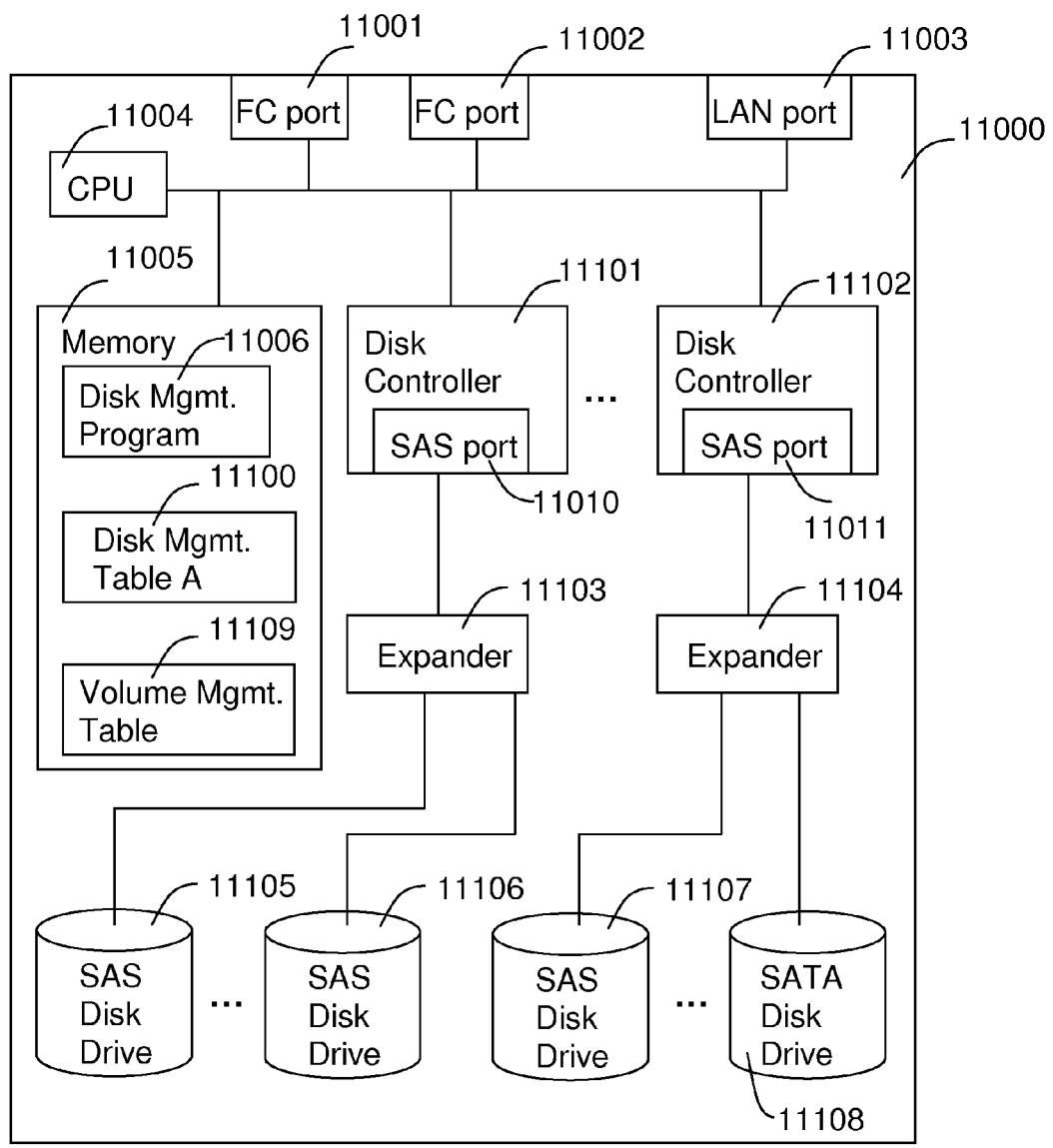
FIG. 13 is a diagram for explaining an example storage system in which the method, apparatus and computer program for managing a storage system having a plurality of different kinds of disk drives according to another embodiment of the present invention.

FIG. 13 shows the storage system 11000 in this embodiment. The disk management table 11100 is named "disk management table A" because, in this embodiment, the disk management table is divided to plural tables. Disk drives 11105-11108 are connected to disk controllers 11101 and 11102 by expanders 11103 and 11104. Each disk controller 11101, 11102 can control plural disk drives.

FIG. 14 shows the structure of disk management table 11100. The difference between the disk management table 11007 of the $1^{st}$ embodiment and the disk management table of the $2^{nd}$ embodiment is Column 11111 of the disk management table 11100. Column 11111 contains combined numbers of disk controller ID and number of expander SAS port. Column 20002 in FIG. 14 contains the status of the expander SAS port, which is SAS, SATA, or NONE which indicates SAS, SATA, or no disk drive is attached to the expander SAS port.

FIG. 24 shows the structure of a volume management table 11109 of this embodiment having a plurality of entries or rows. Each row contains mapping and configuration information of a disk volume. Particularly Columns 200001 and 200002 of the volume management table 11109 contain FC port address and LUN which are assigned to a disk volume, respectively, Column 200003 contains the number of disk drives which compose the disk volume, and Column 200004 contains a pair of ID numbers of a disk controller and an expander port by which the disk drive is controlled and connected.

Figure 15:
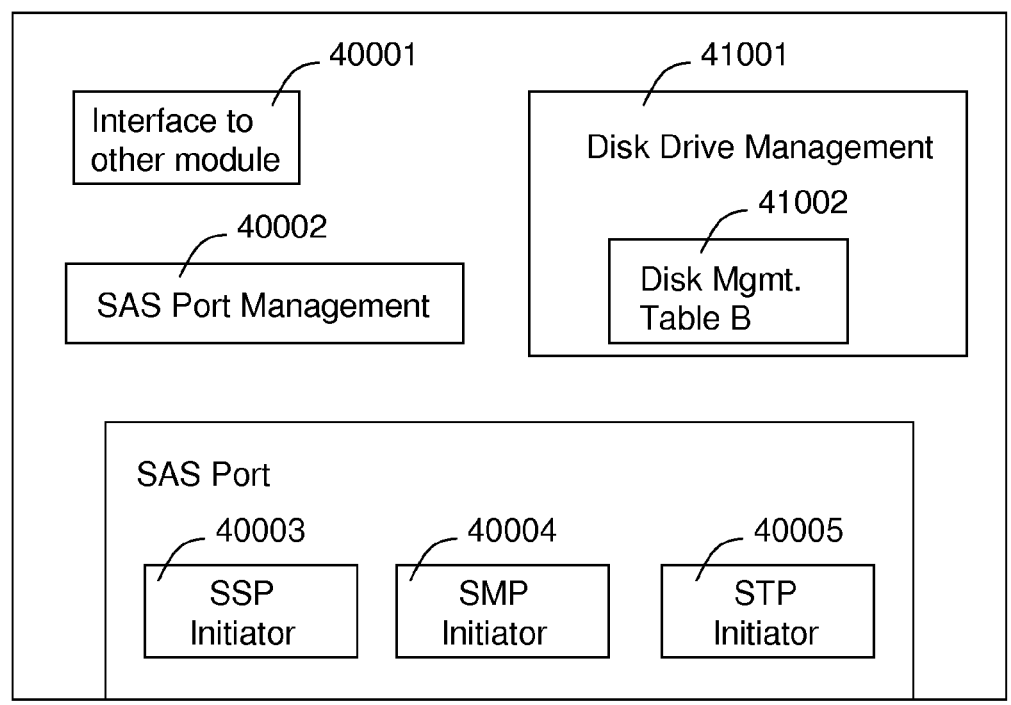
FIG. 15 is a diagram for explaining function aspects of a disk controller 11101, 11102 according to another embodiment of the present invention.

FIG. 15 shows a functional diagram of the disk controller 11101, 11102 in this embodiment. The disk controller 11101, 11102 does not have a STP-SATA bridge function 40006 as shown in FIG. 4 because it does not communicate with SATA drives directly. The bridge function exists in the SAS ports in expanders 11103, 11104 or disk drives 11105-11108. The SAS port management function 40002 has additional roles to manage disk drives attached to the expander device. It performs the discovery process which issues various requests (Discovery, Report General, etc.) to other SAS ports as a management application in a SAS Domain based on SAS specification. The implementation of the discovery process and a management application in a SAS Domain is beyond the scope of this invention. However, such implementation is well known to those of ordinary skill in the art. Disk drive management function 41001 maintains the information of disk drives attached to the expander 11103, 11104 in disk management table B 41002. The disk management table B 41002 comprises part of disk management table A 11100.

FIG. 16 shows the structure of the disk management table B 41002 as having a plurality of entries or rows. Each row stores information of disk drives 11105-11108 attached to the expander 11103, 11104 to which the disk controller 11101, 11102 is connected. Columns 20002-20005 of the disk management table B 41002 are the same as the disk management table A 11100 as shown in FIG. 14.

B. Method to Get Drive Information

Figure 17:
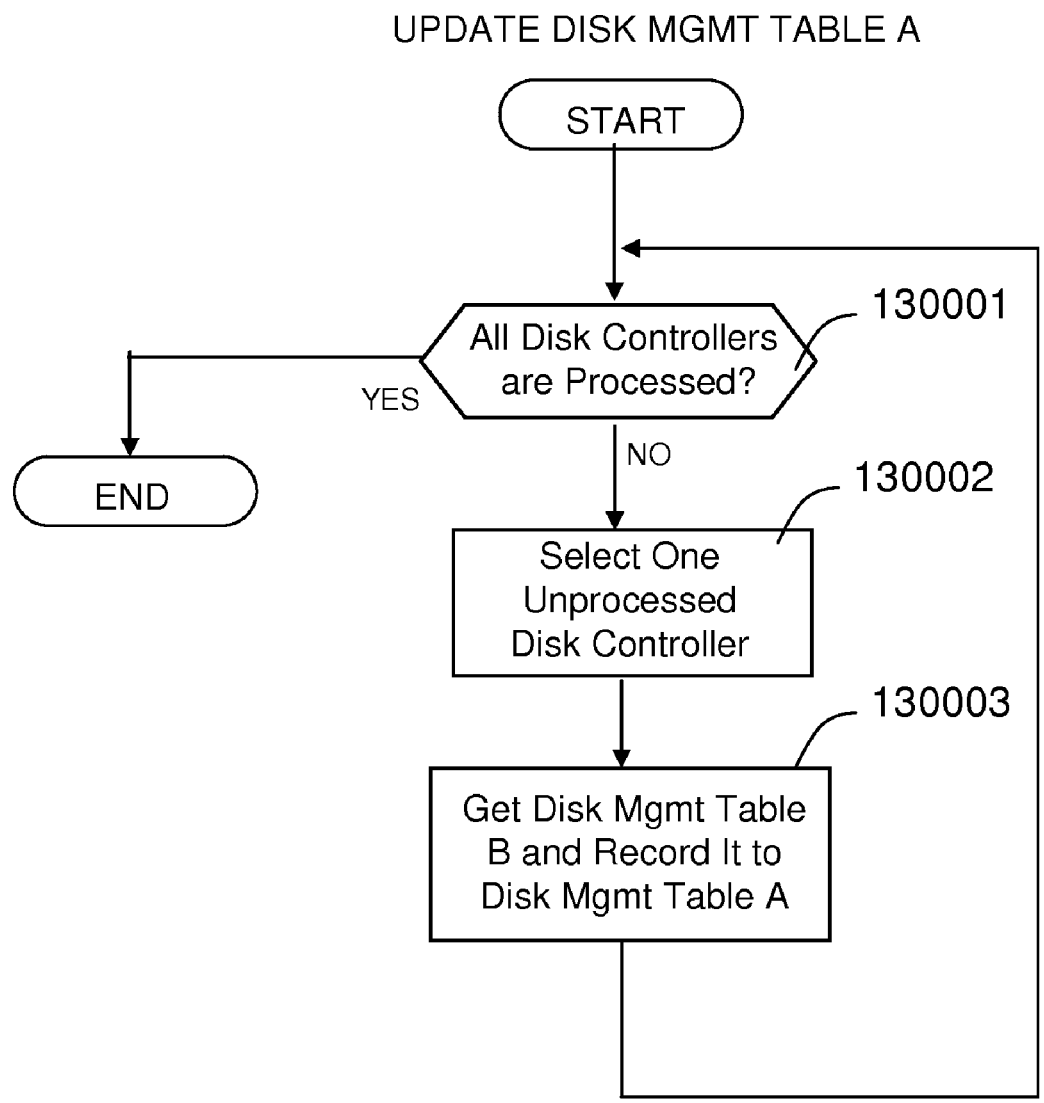
FIG. 17 is a flowchart of the steps performed by the disk management program 11006 according to another embodiment of the present invention.

In this embodiment, the process flow of updating the disk management tables A and B 11100, 41002, which corresponds to FIG. 10 in the 1$^{st}$ embodiment, is modified to manage plural disk drives at a disk controller. The process flow to update the disk management table A 11100 that is performed by the disk management program 11006 is shown in FIG. 17. The flow chart illustrated in FIG. 17 can, for example, be implemented by hardware and/or software. If implemented by software each of the steps of the flow chart can, for example, correspond to computer program code or instructions executed by a processor.

As per FIG. 17 first, the disk management program 11006 chooses one disk controller 11101, 11102 from the disk management table A 11100. If the disk management program 11006 has completed the getting of drive information from all disk controllers 11101, 11102, the process ends (Step 130001). Otherwise, the disk management program 11006 chooses one unprocessed disk controller to get the information of disk drives 11105-11108 attached to the expander 11103, 11104 which the disk controller 11101, 11102 is connected (Step 130002). The disk management program 11006 gets the disk management table B 41002 from the chosen disk controller 11101, 11102 and copies the values in it into the disk management table A 11100 (Step 13003). The disk drive management function 41001 in the disk controller 11101, 11102 provides the disk management table B 41002 for the disk management program 11006. The process described above is repeated for each disk controller 11101, 11102.

Figure 18:
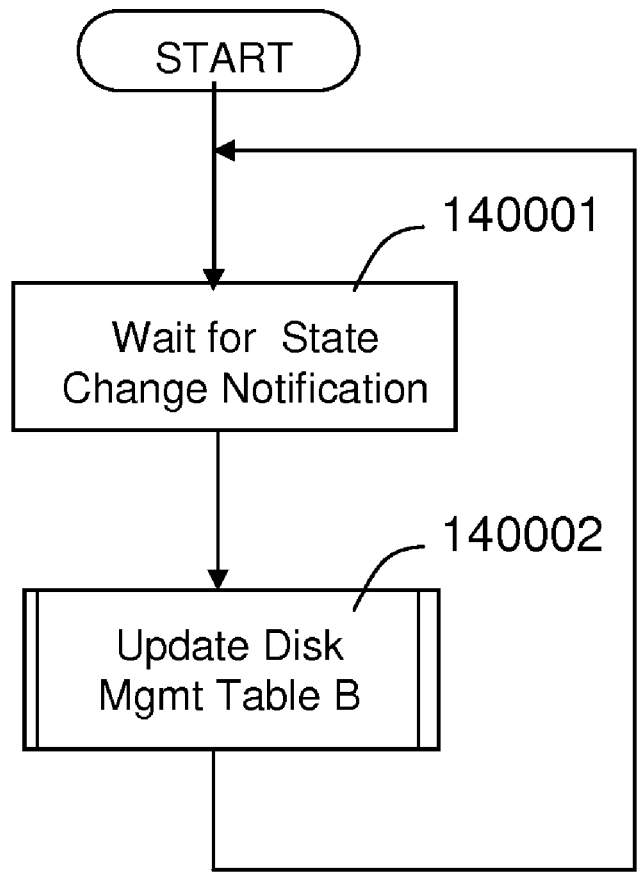
FIG. 18 is a flowchart of further steps performed by the disk management program 11006 according to another embodiment of the present invention.
Figure 19:
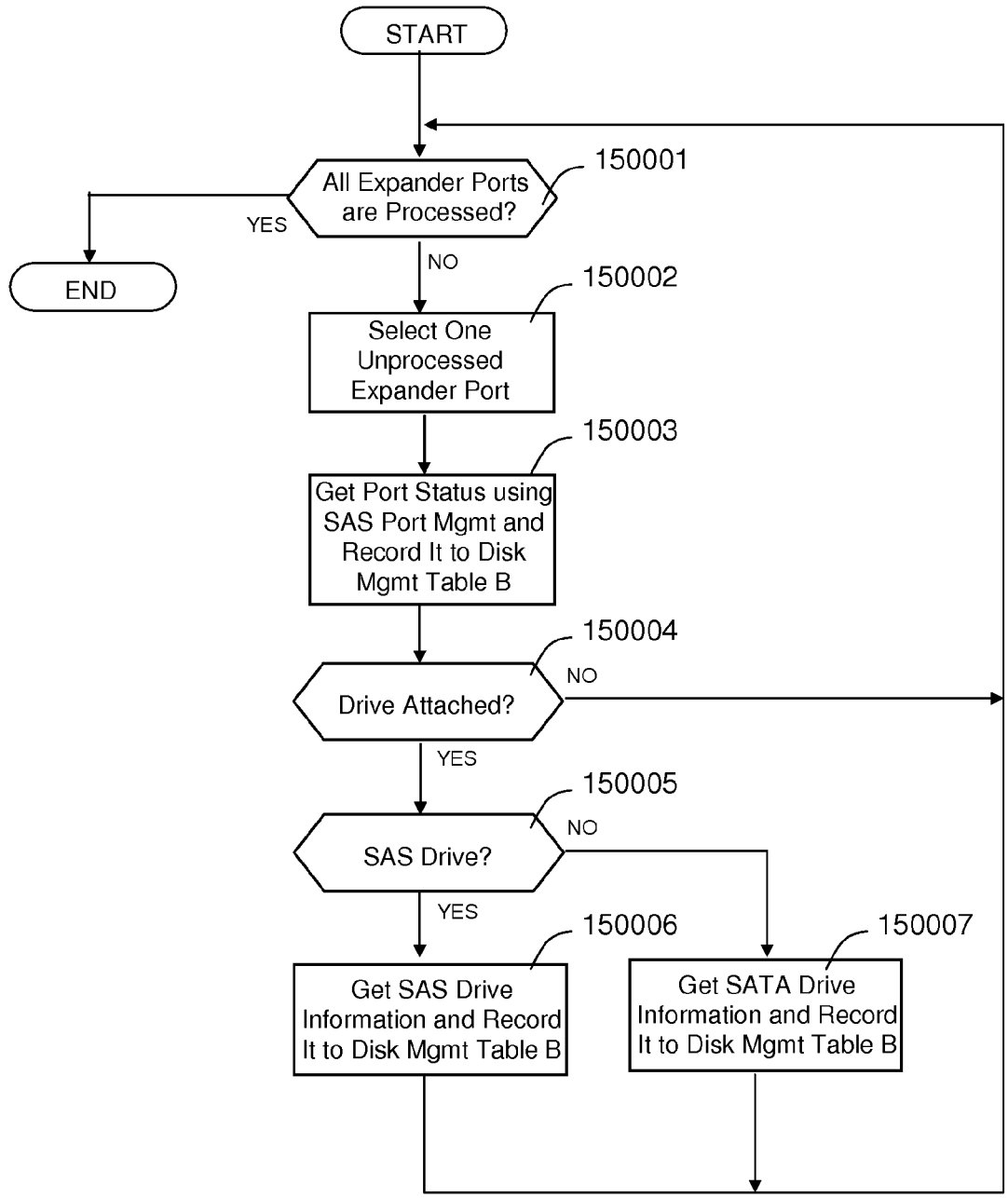
FIG. 19 is a flowchart detailing the steps performed to implement step 140002 of the disk management program 11006 according to another embodiment of the present invention.

FIGS. 18 and 19 show process flows of updating the disk management table B 41002, which is performed by the disk drive management function 41001. The flow chart illustrated in each of FIGS. 18 and 19 can, for example, be implemented by hardware and/or software. If implemented by software each of the steps of the flow chart can, for example, correspond to computer program code or instructions executed by a processor.

In FIG. 18, the disk drive management function 41001 waits for state change notification from SAS port management function 40002 (Step 140001). The notification can be implemented as an interrupt which is triggered by reception of BROADCAST (CHANGE) primitives at SAS port 11010, 11011, which is sent to by expander SAS port. The detailed function of sending and receiving primitives is defined by specification of SAS and is beyond the scope of this invention. However, such detailed function is well known to those of ordinary skill in the art. When the disk drive management function 41001 receives state change notification from the SAS port management function 40002, it updates the disk management table B 41002 (Step 140002).

FIG. 19 shows the detailed steps for implementing Step 140002 of a process flow of updating the disk management table B 41002. As per FIG. 19 first, the disk drive management function 41001 chooses one expander SAS port from the disk management table B 41002. If all expander ports have been processed so as to get the disk drive information all disk drives, then the process ends (Step 150001). Otherwise, the process chooses one unprocessed expander SAS port to get information of a disk drive attached to the chosen port (Step 150002). Next, the process gets the status of the port using the SAS port management function 40002 and stores the status into Column 20002 in the disk management table B 41002 (Step 150003). If the status is 'None', the process goes back to Step 150001 (Step 150004). If a SAS drive is attached (Step 150005), the process issues SCSI commands to the disk drive to get detailed information of the disk drives and stores the detailed information into the disk management table B 41002 (Step 150006). Otherwise, the process issues ATA commands to get information of the disk drives (Step 150007). The process described above is repeated for each disk drive. The process flow can be implemented as an independent thread in the disk controller 11101, 11102.

C. Method to Read and Write Data in Disk Drives

In this embodiment, the storage system 11000 provides host computers with disk volumes which comprise one or more disk drives. A host computer sends a SCSI command which contains FC port address, LUN, and LBA in the disk volume. For simplicity of explanation, host computers read or write one sector by one I/O command.

Figure 25:
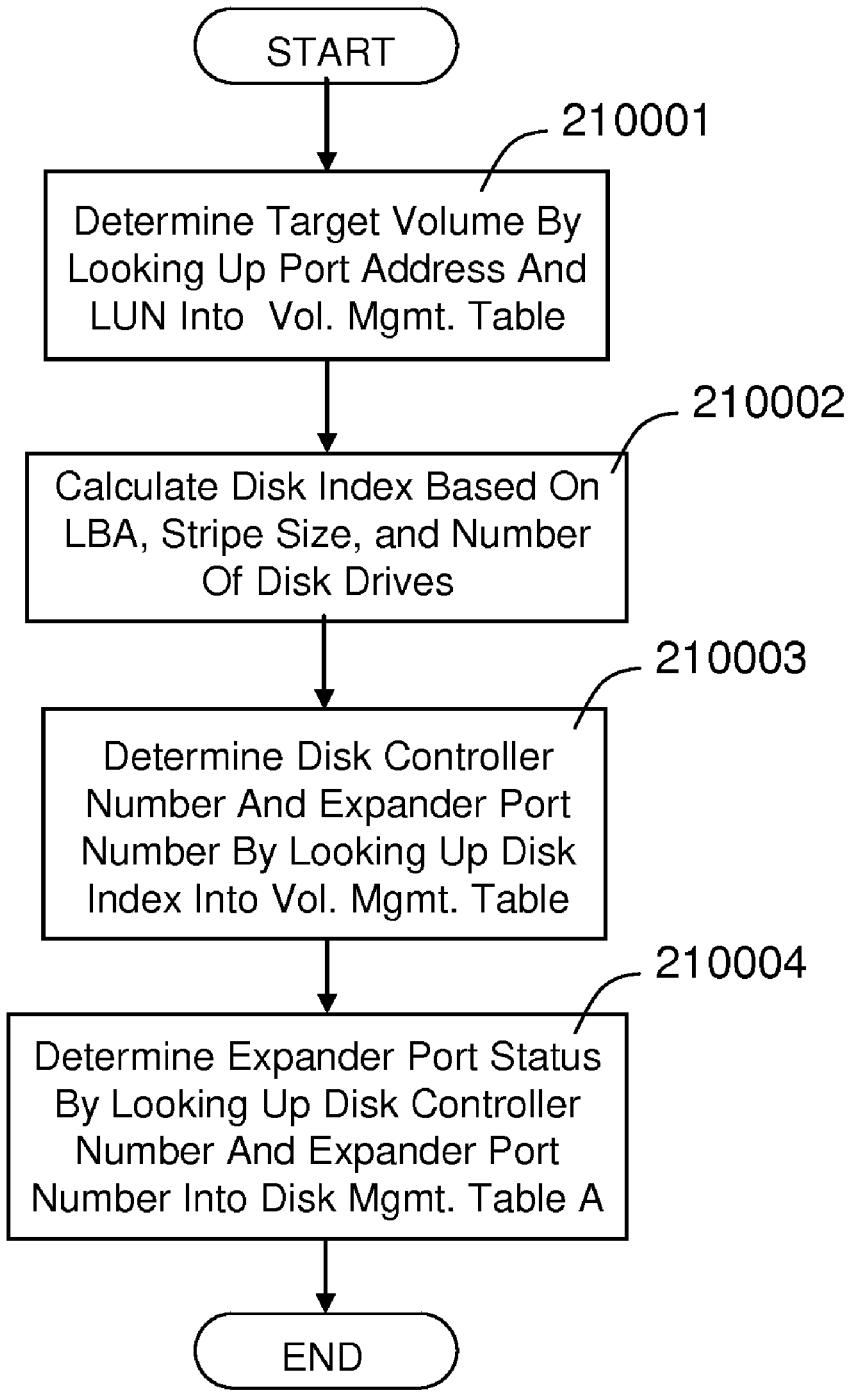
FIG. 25 is a flowchart of steps performed to implement step 180002 of the disk management program 11006 according to another embodiment of the present invention.

The process flow of the disk management program 11006 to read/write data from/to a disk drive is similar to the 1$^{st}$ embodiment. The details of Step 180002 of the flowchart illustrated in FIG. 22 are, however, implemented by the steps as illustrated in FIG. 25. The flow chart illustrated in FIG. 25 can, for example, be implemented by hardware and/or software. If implemented by software each of the steps of the flow chart can, for example, correspond to computer program code or instructions executed by a processor.

First, in FIG. 25, the disk management program 11006 looks into the volume management table 11109 and identifies a disk volume corresponds to the received port address and LUN which are stored in Column 200001 and 200003, respectively (Step 210001). The disk management program 11006 then calculates a disk index number N which is obtained by the following expression: N=(LBA/STRIPE_SIZE) mod D, where STRIPE_SIZE is predefined block size of striping and D is the number of disk drives which is stored in Column 200003 (Step 210002). The LBA within the disk drive which corresponds to the specified LBA within the striped disk volume is also calculated by a simple expression which is not shown but well known to those of ordinary skill in the art.

The disk management program 11006 looks into the volume management table 11109 and identifies a N-th disk controller number and expander port number which are stored in Column 200004 (Step 210003). Finally, the disk management program 11006 looks into the disk management table A 11100 and determines the status of the port corresponds to the disk controller number and expander port number which are stored in Column 11111 (Step 210004).

D. Method to Help User Utilize Plural Kinds of Disk Drives

In this embodiment, the user interface program 12006 provides function to help the user to utilize plural kinds of disk drives based on the kinds of disk drives.

Figure 20:
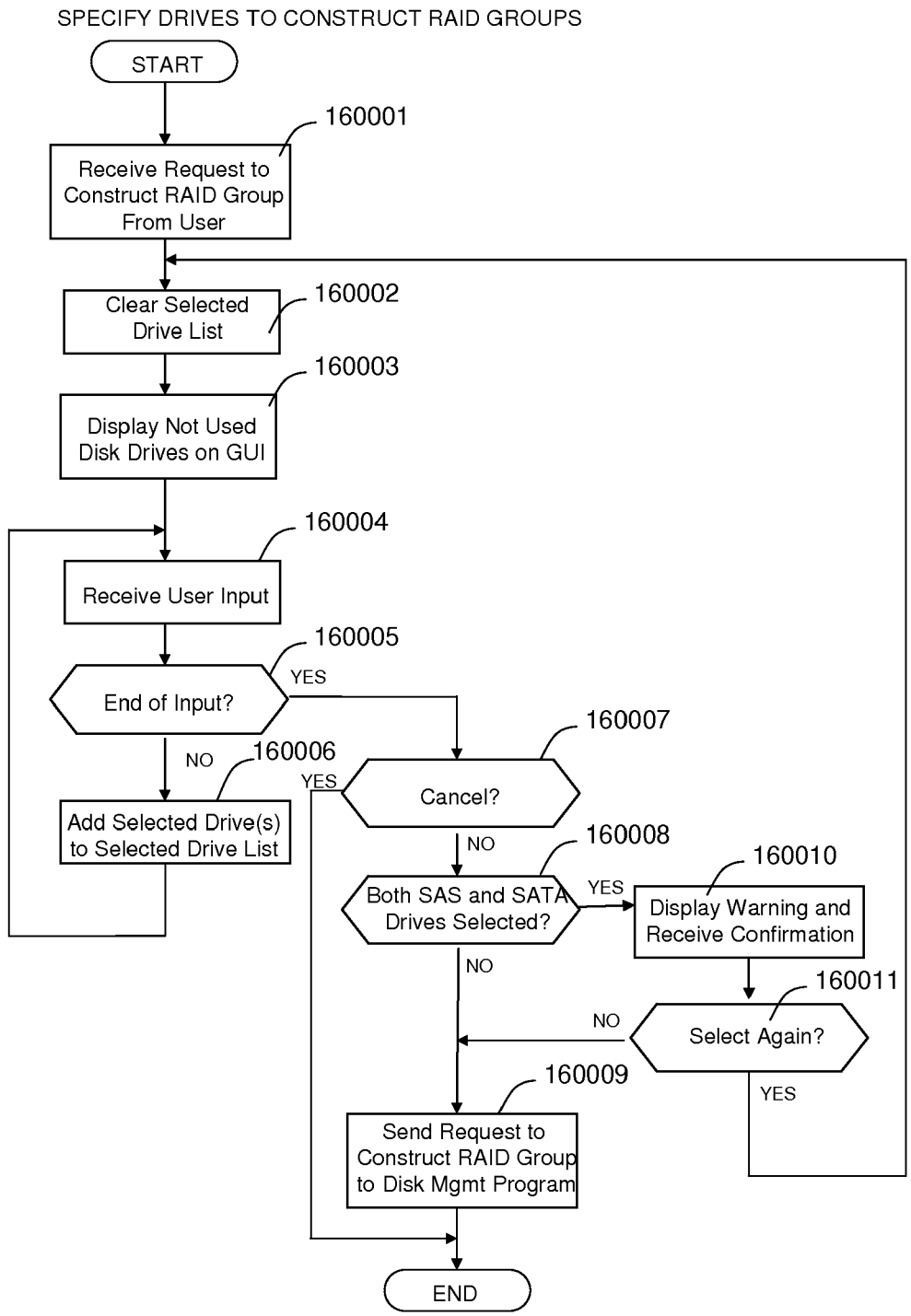
FIG. 20 is a flowchart of steps performed to construct RAID groups of SAS or SATA disk drives according to an embodiment of the present invention.

FIG. 20 shows a process flow of constructing a RAID group of SAS or SATA disk drives. The flow chart illustrated in FIG. 20 can, for example, be implemented by hardware and/or software. If implemented by software each of the steps of the flow chart can, for example, correspond to computer program code or instructions executed by a processor.

As per FIG. 20 first, the user interface program 12006 receives a request to construct a RAID group from the user (Step 160001), clears the list of selected disk drives (Step 160002), and displays the list of disk drives which are not used for any existing RAID groups (Step 160003). The user interface program then receives user's input to specify one or more disk drives (Step 160004). Step 160004 is repeated and the specified disk drives are added to the drive list until the user directs to quit the selection (Steps 160005 and 160006). If the user directs to cancel the process, the process ends (Step 160007). Otherwise, the process checks whether the disk drive list contains both SAS and SATA drives (Step 160008). If the disk drive list contains SAS drives only, or SATA drives only, it sends a request which includes the disk drive list to the storage system 11000 to construct a RAID group (Step 160009). Otherwise, the process displays a warning message on the monitor which states both SAS and SATA drives are chosen, and prompts the user to confirm such (Step 160010). If the user confirms the disk drive list and selects to continue the process (Step 160011), the process goes to Step 160009. Otherwise, the process goes to Step 160002 again.

By the method described above, the user interface program can help the user to make a RAID group which includes disk drives which have uniform characteristics.

In this embodiment, a disk controller is implemented apart from an expander device. But in another implementation, a disk controller and an expander can be put together in one device to reduce the space to deploy units in the storage system and utilize a small chassis.

Thus, the present invention provides a method, apparatus and computer program for managing a storage system having a plurality of different kinds of disk drives that can be attached to the same connecter and use different communication protocols.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A storage system comprising:
a plurality of host ports adaptive to receive commands from a host computer;
a plurality of first ports each adaptive to attach either a Serial Attached Small Computer System Interface (SAS) drive or a Serial Advanced Technology Attachment (SATA) drive, and adaptive to communicate using a Serial SCSI Protocol, a Serial Management Protocol, and a Serial ATA Tunneled Protocol;
a processor and a memory; and
a second port to communicate with a user interface program;
wherein the storage system is configured to execute a discover process to determine whether an attached drive for each of said plurality of first ports is either a SAS drive or a SATA drive, and to select an appropriate protocol from the Serial SCSI Protocol and the Serial ATA Tunneled Protocol depending on a kind of the attached drive and to send a request to the attached drive using the selected protocol in response to a request received from the second port, where the request sent to the attached drive is to retrieve information of the attached drive, the information including capacity, serial number, and status of the attached drive;
wherein the storage system sends, to the user interface program, information retrieved of the attached drive;
wherein the storage system is enclosed in a chassis;
wherein the user interface program displays the status of the attached drive for each of said plurality of first ports in a layout corresponding to a position of the attached drive in the chassis of the storage system; and
wherein when a user clicks a corresponding position to specify one of the attached drives in a window on a monitor, the user interface program displays the information of the corresponding attached drive in another window.

2. The storage system according to claim 1,
wherein the memory includes a disk management table including the information of the attached drives for each of said plurality of first ports and mapping information between the attached drives, port addresses of the plurality of host ports, and logical unit number.

3. A storage system, comprising:
a plurality of host ports adaptive to receive commands from a host computer;
a plurality of first ports each adaptive to attach either a Serial Attached Small Computer System Interface (SAS) drive or a Serial Advanced Technology Attachment (SATA) drive, and adaptive to communicate using a Serial SCSI Protocol, a Serial Management Protocol, and a Serial ATA Tunneled Protocol;
a processor and a memory; and
a second port to communicate with a user interface program;
wherein the storage system us configured to execute a discover process to determine whether an attached drive for each of said plurality of first ports is either a SAS drive or a SATA drive, and to select an appropriate protocol from the Serial SCSI Protocol and the Serial ATA Tunneled Protocol depending on a kind of the attached drive and to send a request to the attached drive using the selected protocol in response to a request received from the second port, where the request sent to the attached drive is to retrieve information of the attached drive, the information including capacity, serial number, and status of the attached drive;
wherein the information of the attached drive further includes entries of number of sectors, and the status of the attached drive includes a number of errors that occurred when data is read from or written to the attached drive; and
wherein the plurality of first ports are connected to either SAS or SATA drives via an expander port.

4. The storage system according to claim 3,
wherein the storage system sends, to the user interface program, information retrieved of the attached drive,
wherein the storage system is enclosed in a chassis, and
wherein the user interface program displays the status of the attached drive for each of said plurality of first ports in a layout corresponding to a position of the attached drive in the chassis of the storage system.

5. The storage system according to claim 4,
wherein when a user clicks a corresponding position to specify one of the attached drives in a window on a monitor, the user interface program displays the information of the corresponding attached drive in another window.

6. The storage system according to claim 5,
wherein the memory includes a disk management table including the information of the attached drives for each of said plurality of first ports and mapping information between the attached drives, port addresses of the plurality of host ports, and logical unit number.

7. A storage system comprising:
a memory unit which has stored therein a disk management program;
a plurality of disk controllers each having a Serial Attached Small Computer System Interface (SAS) port which can be attached to either a SAS disk drive or a Serial Advanced Technology Attachment (SATA) disk drive; and
a local area network (LAN) port which communicates with a user interface program in a management console via a network,
wherein the storage system is enclosed in a chassis, wherein when said disk management program receives a request from said user interface program requesting information as to what kinds of disk drives are attached to said disk controllers, said disk management program communicates with each disk controller to determine what kind of disk drive is attached to said disk controller, based on an indication of what kind of disk drive is attached to said disk controller, selects an appropriate protocol for the disk drive, and sends a request to said disk controller to retrieve detailed information of the disk drive attached to said disk controller using the selected protocol, wherein said storage system sends information of said disk controller to the user interface program for display on a monitor of said management console, wherein said detailed information is retrieved from a disk management table stored in said memory unit, wherein said disk management table includes serial number of the disk drive, and status of disk drives, and wherein the user interface program displays a box for each of the disk drives placed corresponding to a position of the disk drives in the chassis, and when a user clicks a corresponding position to specify one of the disk drives in a window on the monitor, the user interface program displays the information of the corresponding attached disk drive in another window.

8. The storage system according to claim 7, wherein when said user interface program receives the detailed information of the disk drive attached to said disk controller from said disk management program, said user interface program displays at least one of the detailed information of disk drive or statistical values separately on the monitor of said management console for other SAS and SATA disk drives connected to the other disk controllers for review by the user.

9. The storage system according to claim 7, wherein said user interface program helps the user to manage plural kinds of disk drives based on the kinds of the disk drives using the displayed detailed information.

10. The storage system according to claim 7, wherein said status of a disk drive includes a number of errors which may have occurred when data is read from or written to the disk drive.

11. The storage system according to claim 7, wherein said management console includes a system management table having a plurality of entries each having an ID number of said storage system, an internet protocol (IP) address of said storage system, information indicating kinds of disk drives attached to the ports of said storage system, a number of disk drives of each kind attached to the ports of said storage system, a total capacity of each kind of disk drive, and a number of errors for each kind of disk drive.

12. The storage system according to claim 11, wherein the user interface program prior to sending said request consults the system management table to determine an ID number and IP address of said storage system and upon receiving the detailed information stores information included in the detailed information as to the kind of disk drive attached to each disk controller in said system management table.

13. The storage system according to claim 12, wherein said disk management program periodically updates said disk management table.

\* \* \* \* \*